United States Patent [19]

Pinson

[11] 3,939,706

[45] Feb. 24, 1976

[54] HIGH ENERGY SENSOR

[75] Inventor: George T. Pinson, Huntsville, Ala.

[73] Assignee: The Boeing Company, Seattle, Wash.

[22] Filed: Apr. 10, 1974

[21] Appl. No.: 459,464

[52] U.S. Cl............................. 73/190 EW; 250/352
[51] Int. Cl.²..................... G01K 17/00; G01J 5/58
[58] Field of Search......... 73/DIG. 7, 190 R, 190 H, 73/341, 355; 250/338, 352

[56] References Cited
UNITED STATES PATENTS

| | | | |
|---|---|---|---|
| 2,493,651 | 1/1950 | Boelter et al. ..................... | 73/190 X |
| 2,666,089 | 1/1954 | Gier et al. .............................. | 73/355 |
| 2,938,122 | 5/1960 | Tole...................................... | 73/190 |
| 3,255,632 | 6/1966 | Brooks............................ | 250/352 X |
| 3,596,514 | 8/1971 | Mefferd ................................ | 73/190 |
| 3,693,447 | 9/1972 | Sumikama ............................ | 73/341 |
| 3,738,168 | 6/1973 | Mansell................................. | 73/190 |
| 3,765,238 | 10/1973 | Sumikama et al. ................... | 73/355 |
| 3,767,928 | 10/1973 | Bishop et al. ........................ | 250/338 |

OTHER PUBLICATIONS

Davies et al., "Colorimeter with a Highly Reflecting Surface for measuring Intense Thermal Radiation," in Applied Optics, Aug. 71, Vol. 10, No. 8, pp. 1959–1960.

Brown, "Steady State Heat Flux Gauge," in Review of Scientific Instruments, pp. 384–385, Aug. 1964.

*Primary Examiner*—Herbert Goldstein
*Attorney, Agent, or Firm*—Brown, Murray, Flick & Peckham

[57] ABSTRACT

A high energy sensor, particularly adapted for use in analyzing a high power laser beam, which preferably utilizes the change in resistance of a thin-film element as a function of temperature to determine the energy of the beam per unit of area. The sensor itself comprises a top platinum resistor element separated from a botton platinum resistor element by a thermal resistor formed of insulating material. On top of the upper resistor is an electrical insulator, and above this insulator is a platinum reflector protected by a dielectric coating, the reflector being utilized to reflect the major portion of incident wave energy. The assembly is carried on a cooled beryllium oxide substrate or the like in contact with the bottom resistor. A plurality of such sensors can be arranged in an array, and each individual sensor interrogated in sequence to determine the energy distribution of the laser beam. Alternatively, instead of utilizing thin-film resistors on opposite sides of a thermal resistor, it is also possible to utilize two thermoelectric elements (e.g., thermocouples) with the same overall effect.

9 Claims, 5 Drawing Figures

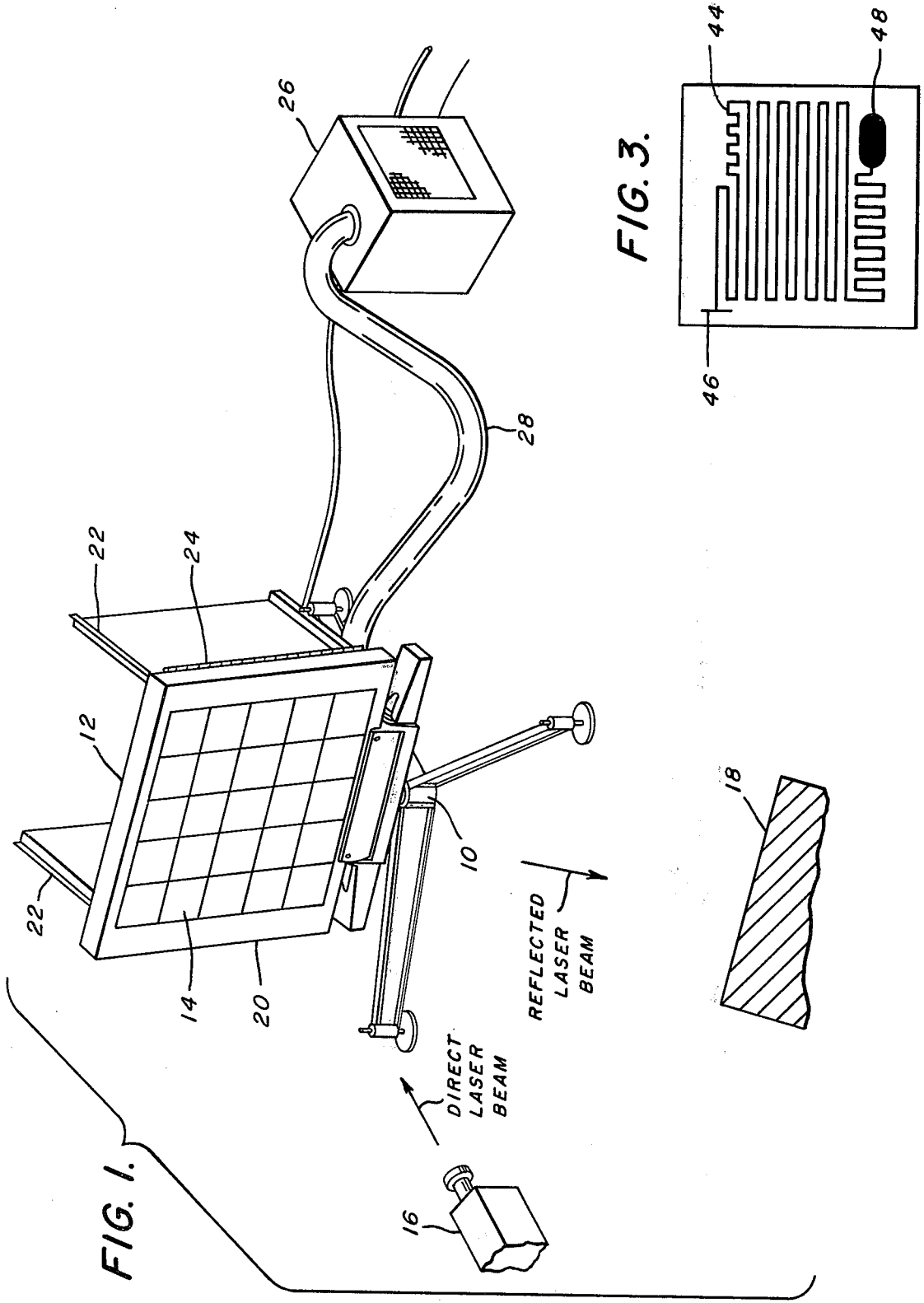

HIGH ENERGY SENSOR

BACKGROUND OF THE INVENTION

As is known, a laser beam does not exhibit a homogeneous structure. The beam contains, for example, transient phenomena known as hot spots or speckles that appear and migrate within the beam as a function of time. As the distance between the laser beam and a target increases, other effects such as scintillation and warping or distortion become more and more pronounced and important. It is desirable, therefore, to provide a rapid response time instrument which can measure the fine grain energy distribution within a high energy laser beam, particularly lasers such as the carbon dioxide type operating in the far infrared field. Such an instrument must be capable of measuring parameters in each unit area of a target surface that will permit the determination of average power, average power density, power centroid, laser spot size and shape, and temperature. Furthermore, the target must be able to withstand incident wave energy levels of 5 kilowatts or greater per square centimeter and must be capable of withstanding a useful, extended duty cycle.

SUMMARY OF THE INVENTION

In accordance with the present invention, a new and improved high energy sensor is provided wherein the total sensor acts as a calorimeter for total and transient energy measurements. A plurality of such sensors can be arranged in an array so as to analyze, for example, the cross-sectional area of a laser beam.

Specifically, there is provided in accordance with the invention an electromagnetic wave energy sensor comprising a substrate of electrical insulating material having a first temperature sensitive electrical element deposited thereon. As will be seen, the electrical element may comprise a resistive element whose resistance changes in response to differences in temperature or a thermoelectric device such as a thermocouple. A layer of electrically insulating and thermally resistive material covers the first thermally sensitive electrical element; while a second thermally sensitive electrical element is deposited on the thermally resistive material, this second element being either resistive or thermoelectric in characteristics. Dielectric material covers the second thermally sensitive electrical element and is adapted to become heated by wave energy incident on the sensor. Electrical circuit means is coupled to the respective thermally sensitive elements for determining the energy per square unit of area incident on the sensor. The sensors can be fabricated individually and then assembled into an array or formed together on a single substrate using vacuum deposition techniques.

As an incident laser beam, for example, cannot be assumed to be constant in energy and the top sensing element cannot be returned to its nominal temperature between sampling cycles, the second or lower sensing element is required. The total transducer thus acts as a calorimeter for total and transient energy measurements and will permit a high degree of accuracy over a wide range.

Since the energy level of high energy laser beams is above 1 kilowatt per square centimeter and can be as high as 5 kilowatts or greater per square centimeter, the sensor must be able to withstand a near continuous energy level of greater than 1 kilowatt per square centimeter without being permanently damaged. Attempting to absorb this energy directly into the target is not practical from a materials standpoint. Therefore, in accordance with the invention, all of the energy not required in the measurement process is reflected, thereby reducing the energy level to a point where the target elements will not be permanently damaged. In this respect, the outer dielectric covering the upper thermally sensitive electrical element is covered with a layer of platinum designed to reflect a selected percentage of the incident energy. The remaining percent of the energy, however, is converted into thermal energy that is conducted through the sensing element.

The above and other objects and features of the invention will become apparent from the following detailed description taken in connection with the accompanying drawings which form a part of this specification, and in which:

FIG. 1 is a perspective view of a target array support frame and its associated subsystems employing the sensors of the invention;

FIG. 3 is a plan view of the resistors utilized in the sensors of FIG. 2;

Figure 4:
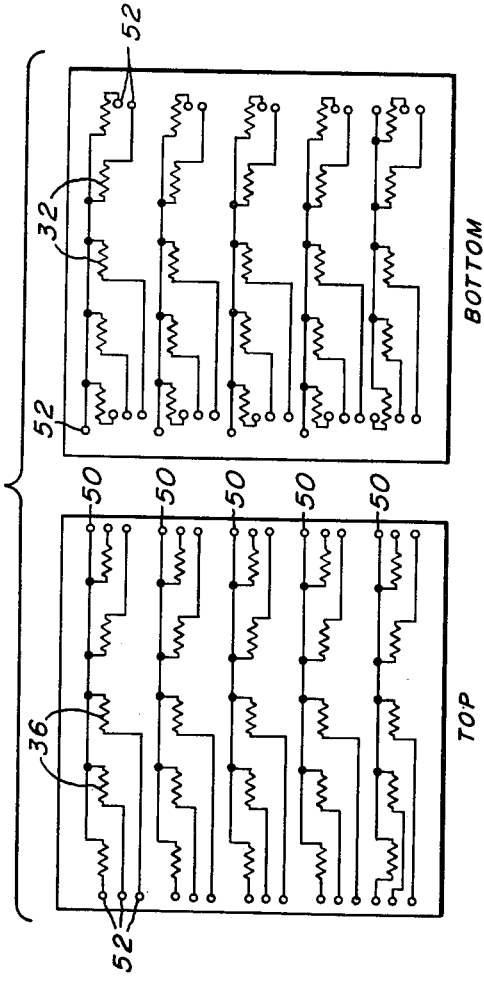
Figure 5:
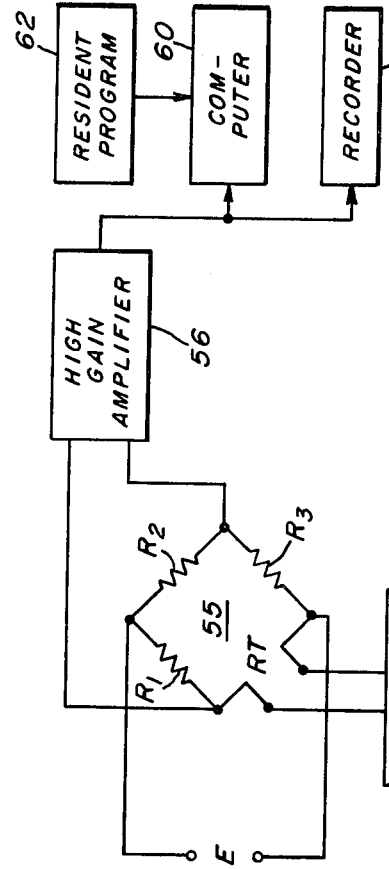
Figure 2:
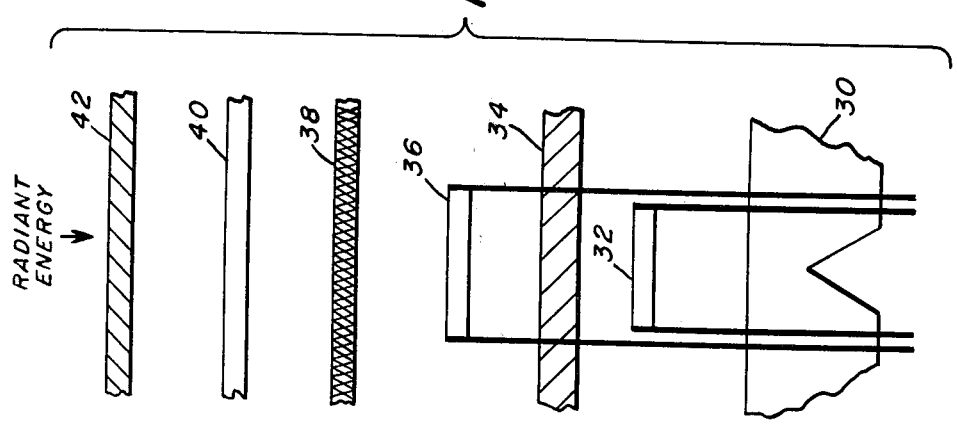
FIG. 2 is an exploded view showing the construction of each of the individual sensors in the array of FIG. 1.

FIG. 4 comprises circuit diagrams illustrating the top and bottom resistor and circuitboard layout schematics for the sensor of FIG. 2; and FIG. 5 illustrates the manner in which the resistive elements of the array can be read out to determine the point-by-point energy concentration at various areas of the array.

With reference now to the drawings, and particularly to FIG. 1, there is shown a tripod support 10 which supports an array 12 of a plurality of individual energy sensors 14. Each of the sensors 14 will hereinafter be described in detail; however, at this point, it will be sufficient to state that each sensor produces electrical signals indicative of the energy level of an incident beam of electromagnetic wave energy at the point covered by the particular sensor. In this respect, a laser beam from laser 16 is directed onto the array 12. Each of the individual sensors 14, as will hereinafter be explained, is adapted to reflect a fixed percentage of the incident wave energy and direct it to an energy dump or absorber 18. This is for the reason that in the case of carbon dioxide lasers, for example, the energy level of the incident radiation may be as high as 5 kilowatts per square centimeter; and if most of the energy were not reflected, the individual sensor elements 14 would be destroyed.

The sensor elements 14 in the array are carried on a frame 20 provided with doors 22 which can be swung forward about hinges 24 to cover the sensors 14 or swung backwardly into the positions shown in order to expose the sensors. The frame 20 is provided with a plenum chamber behind the sensors 14; and this chamber is supplied with air from an air-cooling system 26 via tube 28, the arrangement being such that the backsides of the individual sensors 14 will be maintained at a more or less constant and uniform temperature.

An exploded view of each of the individual sensors 14 is shown in FIG. 2. They comprise a beryllium oxide substrate 30 which is preferably finned to facilitate air cooling by air from the system 26 flowing through the aforesaid plenum chamber behind the sensors. Deposited onto the upper surface of the substrate 30 is a first platinum resistor element 32 having a thickness of about 0.5 micron. Resistor element 32 may, for example, be deposited onto the substrate 30 by means of vacuum deposition techniques. Above the first or bottom resistor 32 is deposited a 50-micron aluminum oxide thermal resistor 34; and deposited on the upper surface of the resistor 34 is a second platinum resistive element 36 which also has a thickness of about 0.5 micron and may be formed by vacuum deposition techniques. The layer 34 of aluminum oxide may be formed over the previously deposited resistor 32 by thin-film vapor deposition techniques, similar to epitaxial deposition.

Formed over the upper resistor 36 is a 0.1 micron aluminum oxide electrical insulating film 38 also formed by vapor deposition techniques. Above the oxide coating 38 is a 0.5 micron platinum reflective coating 40 which serves to reflect a fixed percentage of the incident radiation as explained above. Finally, the platinum reflective coating 40 is covered with a 0.1 micron dielectric protective coating 42 also formed by vapor deposition techniques. The coating 42 may comprise any dielectric which will withstand the temperatures involved as a result of being exposed to radiation having energy levels as high as 5 kilowatts per square centimeter.

The function of the coating 42 is to enhance and protect the reflectivity of the underlying platinum coating 40. The coating 40 must absorb a fixed percentage of the incident power. Each metal has free electrons which reduce its reflectivity when temperatures approach their melting point. Since the melting point of platinum is well above the anticipated maximum temperature, its reflectivity will not be significantly reduced due to this thermal effect. Platinum is also inherently durable and is not very susceptible to oxidation. Energy absorbed by the platinum reflector 40 is converted into thermal energy that is conducted through the high temperature electrical insulating layer 38 of aluminum oxide to the two resistors 36 and 32.

The resistors 36 and 32 are shown in detail in FIG. 3. Each comprises a serpentine configuration 44 deposited onto an underlying substrate by vacuum deposition techniques. At opposite ends of the serpentine configuration 44 are terminals 46 and 48 adapted for connection to connector pins in a manner hereinafter described.

As was explained above, since the incident laser beam cannot be assumed to be constant in energy and the top sensing element cannot be returned to its nominal temperature between sampling cycles, a second sensing element is required, this being the lower resistor 32. Due to the fact that the substrate 30 is cooled, the lower resistor 32 can be maintained at a more or less constant temperature. The thermal mass of the top and bottom resistors 36 and 32 is selected to provide a rapid response time. Furthermore, the thermal resistor or layer of aluminum oxide 34 insures a temperature difference between the two sensing elements. In this respect, the thermal resistor 34 permits the total transducer to act as a calorimeter for total and transient energy measurements, and will permit the accuracy required. Complete isolation of the platinum resistors 32 and 36 by the aluminum oxide 34 is necessary also to avoid migration of impurities into the platinum. Their presence would change the resistance-temperature relationship.

In a typical array, there may be 25 separate sensors each provided with two resistive elements. Top and bottom resistor and circuitboard layout schematics are shown in FIG. 4 for a typical array. Each row of top resistors 36, for example, is connected to a terminal or connector pin 50 which extends through the array and is adapted for connection to one terminal of a power supply. The other side of each of the resistors 36 is adapted to be connected through an associated one of the remaining terminals 52 to multiplexing circuitry in order that the resistors can be interrogated in sequence in a manner hereinafter described. The arrangement of the bottom resistors 32 is the same except that the terminals and connector pins 50 and 52 are misaligned with respect to those on the top in order that they can extend through the back of the array without interference.

Each of the individual resistive elements shown in FIG. 4, for example, can be interrogated by a bridge circuit such as that shown in FIG. 5. The bridge circuit 55 comprises two voltage dividers where the resistance thermometer $R_T$ is connected into one arm of the circuit by a multiplexer 54. In this respect, the multiplexer 54 will connect each of the top and bottom sensing resistors 32 and 36 into the bridge circuit in a predetermined sequence. If the bridge is fed by a constant voltage, $E$, the relationship between the thermometer input resistance, $R_T$, for each of the sensing resistors and the bridge output voltage, $V$, is given by the expression:

$$V = E \left[ \frac{R_2}{R_2 + R_3} - \frac{R_1}{R_1 + R_T} \right] = E \left[ \frac{R_T}{R_1 + R_T} - \frac{R_3}{R_2 + R_3} \right]$$

This equation has a decreasing slope with increasing resistance and its linearity is influenced by the ratio of the fixed resistor arm of the voltage divider to the thermometer resistance.

The output of the bridge circuit of FIG. 5 is applied to a high gain amplifier 56, which provides an infinite output impedance such that the bridge supplies negligible current to its load to minimize self-heating effects. The output of the high gain amplifier 56 can then be applied to a recorder 58 for subsequent analysis; or it can be applied directly to a computer 60 provided with a resident program 62 for analyzing the successive signals applied thereto from the bridge circuit 55, these successive signals being indicative of the temperature sensed by the individual resistive elements. These temperatures can then be utilized in calorimetric equations stored in the resident program 62 of the computer to determine the energy per square unit of area at each of the sensors. In this regard, the heat flow per unit time (i.e., average power) of a laser sensor module is given by:

$$\overset{\circ}{Q} = k \frac{A}{t} (T_1 - T_2) \qquad (1)$$

where:
$\overset{\circ}{Q}$ = heat flow per unit time or average power (watts);
$k$ = thermal conductivity of the $Al_2O_3$ thermal resistor (watts/cm °K);
$t$ = thickness of $Al_2O_3$ (cm);
$T_1$ = temperature of top resistor (°K);
$T_2$ = temperature of bottom resistor (°K); and $A$ = area of module (cm$^2$).

The thermal conductivity is a function of temperature and is given by the standard empirical equation:

$$k = 356.5102 \, (10^{-1.2134 \log T}) \qquad (2)$$

where: $T$ = temperature (°K). The accuracy of this equation is ± 2%. Since the thermal resistor (Al$_2$O$_3$) has a finite thickness, the temperature to be used in the calculation of $k$ is determined by:

$$T = \frac{T_1 + T_2}{2} \qquad (3)$$

which is the average temperature of the top and bottom surfaces. The remaining quantities to be determined are the temperatures $T_1$ and $T_2$. The resistance of platinum as a function of temperature is given by the empirical formula:

$$\frac{R_T}{R_0} = 1 + \alpha T + \beta T^2 \qquad (4)$$

where:

$R_T$ = resistance of temperature T;
$R_0$ = initial resistance;
$T$ = temperatures (°C)
$\alpha$ = 3.92 × 10$^{-3}$ (°C$^{-1}$)
$\beta$ = 0.588 × 10$^{-6}$ (°C$^{-2}$)  for − 40°C ≤ T ≤ 1000°C The equation can be solved for $T$ which results in two roots. However, for the temperature range we are considering (0° ≤ T ≤ 1000°C), the root desired is:

$$T = \frac{-\alpha}{2\beta} - \left[\left(\frac{\alpha}{2\beta}\right)^2 - \frac{1}{\beta}\left(1 - \frac{R_T}{R_0}\right)\right]^{1/2}$$

which becomes $$T = \left[3.3333 - (12.81179) - 1.70068 \left(\frac{R_T}{R_0}\right)^{1/2}\right] \times 10^3 \qquad (5)$$

where $T$ is in degrees centigrade. By measuring the resistances of the two platinum elements initially and at any time, the temperatures of the elements ($T_1$ and $T_2$) are determined using Equation (5). These temperatures are used in Equation (3) to obtain the temperature to be used in Equation (2). The thermal conductivity from Equation (2) and the two temperatures ($T_1$ and $T_2$) are then used in Equation (1) to determine the average power on each element.

Thus, each of the temperatures $T_1$ and $T_2$ is measured for the top and bottom resistor in each sensor. These are used in the foregoing equations in computer 60 to determine the average power sensed by each sensor. From this a plot can be derived showing the average power sensed at various points over the cross-sectional area of the laser beam. Various types of plotting devices can be used within the skill of the art.

It will also be appreciated that instead of using platinum resistive elements, it is also possible to use bimetallic or thermocouple elements to derive signals which are indicative of temperature on opposite sides of a thermal resistor. In all cases, however, it is necessary to have two sensing elements in each sensor.

The invention thus provides a sensor array that can be fabricated in various dimensions using vacuum deposition techniques. Prior art sensors of this type were built as individual units; and while they could be collected into an array, they could not be exactly dimensionalized to meet unique needs and requirements. With the present invention, the individual sensors can be fabricated as to small a dimension or in the geometry required to meet these unique needs. For example, if the user needs a sensor array with dimensions of 0.001 inch by 0.001 inch or less, the fabrication technique of the invention can provide the sensor individually or in an array that can provide a high speed, accurate measuring system.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An electromagnetic wave energy sensor comprising a substrate of electrical insulating material, a first thermally sensitive electrical element carried on said substrate, a layer of electrically insulating thermally resistive material covering said first electrical element, a second thermally sensitive electrical element deposited on said thermally resistive material on the side thereof opposite said first electrical element, dielectric material covering said second electrical element and adapted to become heated by wave energy incident on the sensor, a layer of metallic reflective material deposited on said dielectric material for absorbing a fixed percentage of incident wave energy, the sensor being positioned with respect to incident wave energy so that said reflective material will reflect the major portion of the incident wave energy, and electrical circuit means coupled to the respective electrical elements for determining the energy per unit of area impinged on said sensor.

2. The wave energy sensor of claim 1 wherein said thermally sensitive electrical elements comprise resistors whose resistivity changes with temperature.

3. The wave energy sensor of claim 1 wherein said thermally sensitive electrical elements comprise thermocouples.

4. The wave energy sensor of claim 2 wherein said resistors are formed from platinum.

5. The wave energy sensor of claim 2 wherein said electrical circuit means coupled to the electrical elements determines the change in resistivity of said resistors due to heating thereof by incident wave energy.

6. The wave energy sensor of claim 4 wherein said electrical circuit means includes a bridge circuit supplied by a constant voltage source, and means for connecting the respective electrical elements into one leg of the bridge circuit.

7. The wave energy sensor of claim 1 wherein said reflective material comprises platinum.

8. The wave energy sensor of claim 1 including a layer of dielectric material covering said reflective material for enhancing and protecting the reflectivity thereof.

9. An array of sensor elements of the type defined in claim 1, and including multiplexing means for electrically interrogating both the first and second electrical elements in each sensor element in the array.

* * * * *